(12) United States Patent
Vangipuram et al.

(10) Patent No.: US 12,032,960 B2
(45) Date of Patent: Jul. 9, 2024

(54) FLEXIBLE SUPPORT FOR DEVICE EMULATION AND BANK SWAPPING

(71) Applicant: Infineon Technologies AG, Neubiberg (DE)

(72) Inventors: Sandeep Vangipuram, Bristol (GB); Glenn Ashley Farrall, Long Ashton (GB)

(73) Assignee: Infineon Technologies AG, Neubiberg (DE)

( * ) Notice: Subject to any disclaimer, the term of this patent is extended or adjusted under 35 U.S.C. 154(b) by 181 days.

(21) Appl. No.: 17/708,882

(22) Filed: Mar. 30, 2022

(65) Prior Publication Data

US 2023/0315448 A1  Oct. 5, 2023

(51) Int. Cl.
*G06F 9/30* (2018.01)
*G06F 12/02* (2006.01)

(52) U.S. Cl.
CPC ........ *G06F 9/30018* (2013.01); *G06F 9/3004* (2013.01); *G06F 9/30105* (2013.01); *G06F 9/30145* (2013.01); *G06F 12/0238* (2013.01); *G06F 2212/7201* (2013.01)

(58) Field of Classification Search
CPC ............. G06F 12/0238; G06F 9/30018; G06F 9/3004; G06F 9/30105; G06F 9/30145; G06F 2212/7201
See application file for complete search history.

(56) References Cited

U.S. PATENT DOCUMENTS

| | | | | |
|---|---|---|---|---|
| 6,260,159 | B1 * | 7/2001 | Garnett | G06F 11/1658 |
| | | | | 710/308 |
| 2017/0038984 | A1 * | 2/2017 | Manabe | G06F 13/4022 |
| 2017/0309339 | A1 * | 10/2017 | Hsiung | G11C 16/0466 |
| 2020/0401334 | A1 * | 12/2020 | Saxena | G06F 3/064 |

* cited by examiner

*Primary Examiner* — Zachary K Huson
(74) *Attorney, Agent, or Firm* — LOWENSTEIN SANDLER LLP (57) ABSTRACT

A non-volatile memory (NVM) integrated circuit device includes a processing device and an NVM array of memory cells partitioned into a first physical region and a second physical region. The NVM integrated circuit device also includes a plurality of routing circuits, a first decoder associated with a first routing circuit, and a second decoder associated with a second routing circuit. The NVM integrated circuit device also includes a first programmable register coupled to the plurality of routing circuits, wherein the first programmable register is to store a first multi-bit value, the first multi-bit value programmed by the processing device to configure a first address range associated with the first decoder. The NVM integrated circuit device also includes a second programmable register coupled to the plurality of routing circuits, wherein the second programmable register is to store a second multi-bit value, the second multi-bit value programmed by the processing device to configure a second address range associated with the second decoder.

20 Claims, 10 Drawing Sheets

Address Map 601

|  | Device 661 | | | Device 663 | | | Device 665 | | | Device 667 | | |
|---|---|---|---|---|---|---|---|---|---|---|---|---|
|  | Base | Mask | Lbits | Base | Mask | Lbits | Base | Mask | Lbits | Base | Mask | Lbits |
| NVMI0 | 0x800 | 0xDFC | 20 | 0x800 | 0xDFC | 20 | 0x800 | 0xDFC | 20 | 0x800 | 0xDFC | 20 |
| NVMI1 | 0x804 | 0xDFC | 20 | 0x804 | 0xDFC | 20 | 0x804 | 0xDFC | 20 | 0x804 | 0xDFE | 20 |
| NVMI2 | 0x808 | 0xDFC | 20 | 0x808 | 0xDFC | 20 | 0x808 | 0xDFE | 20 | 0x806 | 0xDFE | 20 |
| NVMI3 | 0x80C | 0xDFC | 20 | 0x80C | 0xDFE | 20 | 0x80A | 0xDFE | 20 | 0xFFFF | 0x000 | 20 |
| NVMI4 | 0x810 | 0xDFC | 20 | 0x80E | 0xDFE | 20 | 0xFFFF | 0x000 | 20 | 0xFFFF | 0x000 | 20 |
| NVMI5 | 0x814 | 0xDFC | 20 | 0xFFFF | 0x000 | 20 | 0xFFFF | 0x000 | 20 | 0xFFFF | 0x000 | 20 |
| CSRM | 0x840 | 0xDFF | 20 | 0x840 | 0xDFF | 20 | 0x840 | 0xDFF | 20 | 0x840 | 0xDFF | 20 |

Address Map 603

|  | Device 661 | | | Device 663 | | | Device 665 | | | Device 667 | | |
|---|---|---|---|---|---|---|---|---|---|---|---|---|
|  | Base | Mask | Lbits | Base | Mask | Lbits | Base | Mask | Lbits | Base | Mask | Lbits |
| NVMI0 | 0x800 | 0xDDE | 20 | 0x800 | 0xDDE | 20 | 0x800 | 0xDDE | 20 | 0x800 | 0xDFC | 20 |
| NVMI1 | 0x802 | 0xDDE | 20 | 0x802 | 0xDDE | 20 | 0x802 | 0xDDE | 20 | 0x804 | 0xDDF | 20 |
| NVMI2 | 0x804 | 0xDDE | 20 | 0x804 | 0xDDE | 20 | 0x804 | 0xDDF | 20 | 0x806 | 0xDDF | 20 |
| NVMI3 | 0x806 | 0xDDE | 20 | 0x806 | 0xDDF | 20 | 0x805 | 0xDDF | 20 | 0xFFFF | 0x000 | 20 |
| NVMI4 | 0x808 | 0xDDE | 20 | 0x807 | 0xDDF | 20 | 0xFFFF | 0x000 | 20 | 0xFFFF | 0x000 | 20 |
| NVMI5 | 0x80A | 0xDDE | 20 | 0xFFFF | 0x000 | 20 | 0xFFFF | 0x000 | 20 | 0xFFFF | 0x000 | 20 |
| CSRM | 0x840 | 0xDFF | 20 | 0x840 | 0xDFF | 20 | 0x840 | 0xDFF | 20 | 0x840 | 0xDFF | 20 |

FIG. 6A

Address Map 601

| | Device 661 | | Device 663 | | Device 665 | | Device 667 | |
|---|---|---|---|---|---|---|---|---|
| | Base Select Bit | Base Address Mask | Base Select Bit | Base Address Mask | Base Select Bit | Base Address Mask | Base Select Bit | Base Address Mask |
| NVMI0 | 1 | 0x1 | 1 | 0x1 | 1 | 0x1 | 1 | 0x1 |
| NVMI1 | 1 | 0x1 | 1 | 0x1 | 1 | 0x1 | 0 | 0x0 |
| NVMI2 | 1 | 0x1 | 1 | 0x1 | 0 | 0x0 | 0 | 0x0 |
| NVMI3 | 1 | 0x1 | 0 | 0x0 | 0 | 0x0 | | |
| NVMI4 | 1 | 0x1 | 0 | 0x0 | | | | |
| NVMI5 | 1 | 0x1 | | | | | | |

Address Map 603

| | Device 661 | | Device 661 | | Device 661 | | Device 661 | |
|---|---|---|---|---|---|---|---|---|
| | Base Select Bit | Base Address Mask | Base Select Bit | Base Address Mask | Base Select Bit | Base Address Mask | Base Select Bit | Base Address Mask |
| NVMI0 | 5 | 0x1 | 5 | 0x1 | 5 | 0x1 | 5 | 0x1 |
| NVMI1 | 5 | 0x1 | 5 | 0x1 | 5 | 0x1 | 5 | 0x0 |
| NVMI2 | 5 | 0x1 | 5 | 0x1 | 5 | 0x0 | 5 | 0x0 |
| NVMI3 | 5 | 0x1 | 5 | 0x0 | 5 | 0x0 | | |
| NVMI4 | 5 | 0x1 | 5 | 0x0 | | | | |
| NVMI5 | 5 | 0x1 | | | | | | |

FLEXIBLE SUPPORT FOR DEVICE EMULATION AND BANK SWAPPING

TECHNICAL FIELD

The disclosure relates to the field of multicore devices, and in particular, to flexible support for device emulation and bank swapping.

BACKGROUND

Certain devices (e.g., multicore devices) require support for software-over-the-air (SOTA) updates as well as device emulation. SOTA updates are updates (e.g., data) that can be sent to devices from cloud-based services across wireless local area networks (WLANs) or mobile networks. Device emulation allows for devices of larger sizes in a family to be configured to behave like devices of smaller sizes in the family. In addition, multicore devices typically support multiple types of configuration modes, such as linear, SOTA-A, and SOTA-B. Each configuration mode uses a different memory map addressing scheme. Thus, multicore devices must be able to support SOTA updates for each configuration mode. With the various configurations that require support, there are a large number of combinations of memory map addressing schemes that need to be supported for both SOTA updates and device emulation. In conventional multicore devices, each combination is typically enumerated (i.e., hardcoded) into the devices' hardware. However, this solution can be expensive in terms of implementation as well as verification. Further, any later changes to the design of the devices will require additional expense.

BRIEF DESCRIPTION OF THE DRAWINGS

The disclosure is illustrated by way of example, and not of limitation, in the figures of the accompanying drawings.

DETAILED DESCRIPTION

As described above, certain multicore devices require support for software-over-the-air (SOTA) updates as well as device emulation. SOTA updates are updates (e.g., data) that can be sent to devices from cloud-based services across Wi-Fi or mobile networks. Device emulation allows for devices of larger sizes in a family to be configured to behave like devices of smaller sizes in the family. In addition, multicore devices typically require multiple types of configuration modes, such as linear, SOTA-A, and SOTA-B. Each configuration mode uses a different memory map addressing scheme. In a linear configuration, the entire non-volatile memory can be available to software applications. In SOTA-A and SOTA-B configurations, the non-volatile memory can be partitioned into two equal halves (an A image and a B image) that are each attached to separate banks of memory. While the device executes from the A image, a SOTA update can occur on the B image. After a system reset, the device can be booted up from the B image rather than the A image. Thus, the device can receive SOTA updates in the background without any downtime.

Since multicore devices can be configured according to various configurations, multicore devices must be able to support SOTA updates for each configuration mode. With the various configurations that require support, there are a large number of combinations of memory map addressing schemes that need to be supported for both SOTA updates and device emulation, as described in more detail herein below with respect to FIGS. 2-5. In conventional devices, a typical solution is for each combination to be enumerated (i.e., hardcoded) into the devices' hardware. However, this solution can be expensive—there are a lot number of address ranges that would need to be implemented on the hardware and then verified. Further, any later changes to the design of the devices will require additional expense in terms of implementation and verification.

The present disclosure addresses the above deficiencies (and other deficiencies that will be discussed below in more detail) by providing for flexible support for device emulation and bank swapping by using configurable registers that can be used to decode address ranges. In various embodiments, a non-volatile memory (NVM) integrated circuit device (e.g., a flash or other similar device) can include at least a processing device, a set of routing circuits, a decoder associated with each routing circuit, one or more programmable registers coupled to the set of routing circuits, where each programmable register stores a set of values, including a multi-bit value, to configure an address range received at a routing circuit. The NVM integrated circuit device can include an array of memory cells that are partitioned into at least two physical regions. In some embodiments, each programmable register can also store a base field value and a mask field value. When a decoder at a routing circuit receives a logical address (e.g., a memory access operation from a host microcontroller attached to the NVM integrated circuit device), the decoder can decode the logical address using at least the multi-bit value stored at a programmable register associated with the routing circuit.

In some embodiments, decoding the logical address can result in either an acceptance or rejection of a memory address at the routing circuit for the logical address. In some embodiments, a decoder associated with a routing circuit can receive the logical address and compare the logical address to a multi-bit value stored at a programmable register of the set of routing circuits. Responsive to comparing the logical address to the multi-bit values stored at each programmable register of the set of routing circuits, the decoder can identify which routing circuit of the set of routing circuits to transmit data associated with the logical address.

In some embodiments, if the logical address is accepted at a routing circuit, the decoder can further decode the logical address using the multi-bit value, a bank select field value, and a bank address mask value stored in the programmable register in order to identify which physical region and destination address within the NVM integrated circuit device to transmit the data associated with the logical address. Further, the decoder can decode the logical address using a configuration mode field value stored in the programmable register in order to identify the configuration mode that the NVM integrated circuit device is in (e.g., linear, SOTA-A, SOTA-B).

Aspects of the present disclosure can thus allow for each incoming address range to be configurable using register programming instead of having to hardcode each combination of address ranges according to the multiple configurations in hardware of the device. This can result in a lower expense in terms of implementing and verifying each device, as the various combinations do not need to be hardcoded in the hardware. Rather, the registers are programmed once, and the registers are then used flexibly to handle decoding address ranges for SOTA updates and device emulation. Further, aspects of the present disclosure can minimize the impact in terms of implementation and verification in the case of any later changes to the design of the devices, as additional combinations do not need to be hardcoded in hardware. These and additional advantages will be apparent to one of ordinary skill in the art in view of the following description.

Figure 1A:
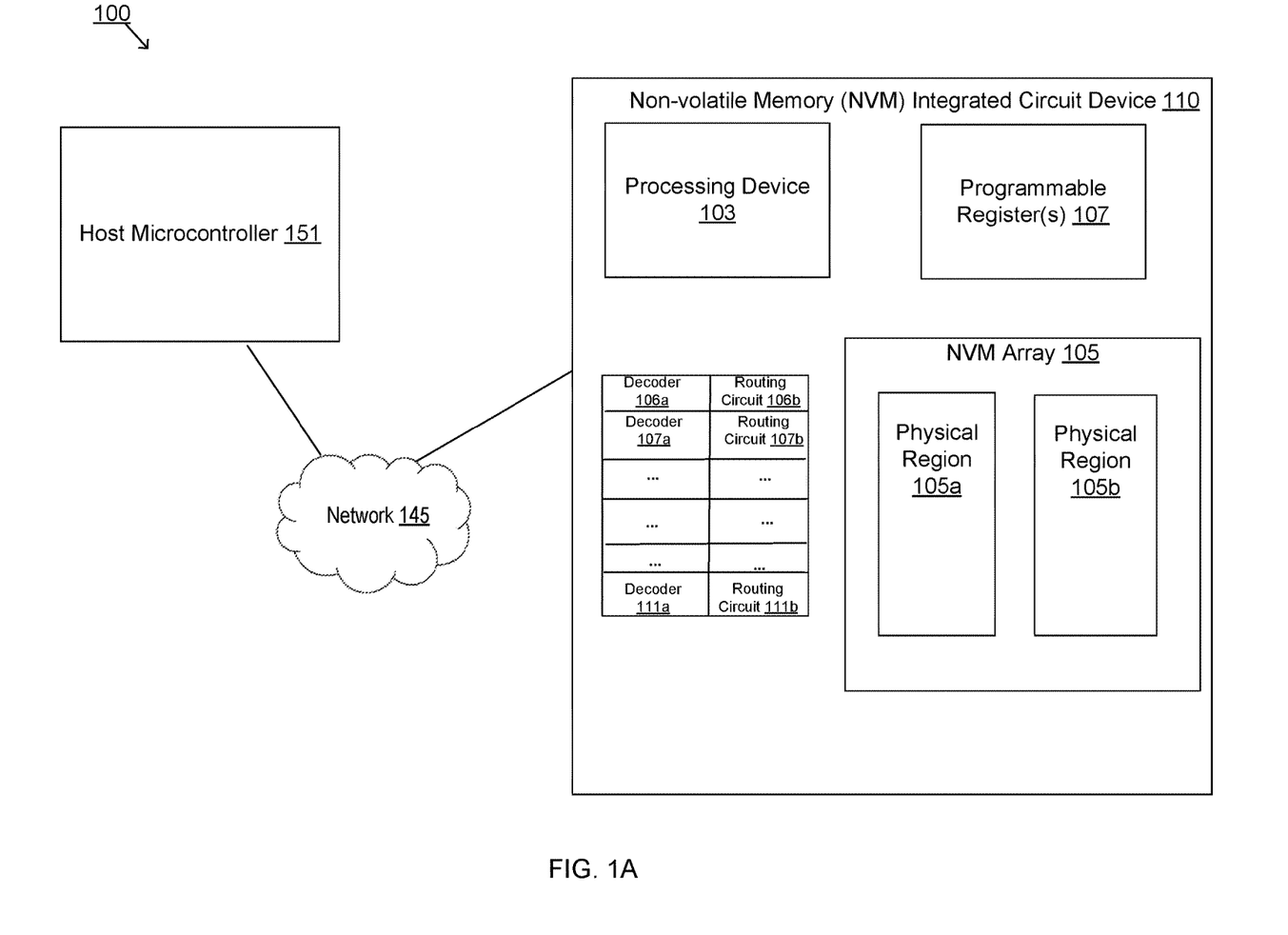
FIG. 1A is a block diagram of a system that employs a non-volatile memory (NVM) integrated circuit (IC) device that includes an NVM array of memory cells, in accordance with embodiments of the present disclosure.

FIG. 1A is a block diagram of a system 100 that employs a non-volatile memory (NVM) integrated circuit (IC) device 110 that includes an NVM array of memory cells, or NVM array 105 for simplicity, according to various embodiments. The system 100 can further include a host microcontroller 151 (or MCU) that can be coupled to the NVM IC device 110 via a network 145 or the cloud. In some embodiments, the host microcontroller 151 is integrated into the NVM IC device 110. The host microcontroller 151 can request memory access via the network 145 to the NVM IC device 110, where the NVM array 105 can also be or include a user array of memory cells available for accessing (e.g., writing and/or reading) data. In one embodiment, the system 100 is integrated within a distributed computing and control system of a vehicle, airplane, or other more extensive operation devices.

In various embodiments, the NVM IC device 110 can include a processing device 103, the NVM array 105 of memory cells, one or more programmable registers 107, a set of decoders 106a-111a, and a set of routing circuits 106b-111b. In this sense, the NVM IC device 110 can be an integrated system-on-a-chip device (SoC), having all of these components packaged on a single die. The processing device 103 can be a central processing unit (CPU) adapted to include on-board ROM and random access memory (RAM) in addition to processing capability to perform the functions discussed hereinafter. In various embodiments, the processing device 103 is a complex instruction set computing (CISC) microprocessor, reduced instruction set computing (RISC) microprocessor, very long instruction word (VLIW) microprocessor, or a processor implementing other instruction sets or processors implementing a combination of instruction sets. In alternative embodiments, the processing device 103 is a special-purpose processing device such as an application specific integrated circuit (ASIC), a field programmable gate array (FPGA), a digital signal processor (DSP), network processor, or the like.

In some embodiments, the NVM array 105 is partitioned into multiple physical regions, including a first physical region 105a and a second physical region 105b. In some embodiments, the NVM array 105 can be partitioned into additional physical regions based on the design of the device.

In some embodiments, the NVM IC device 110 can include a set of decoders, such as decoders 106a to 111a. The NVM IC device 110 can also include a set of routing circuits, such as routing circuits 106b to 111b. In some embodiments, a decoder can be coupled to a routing circuit. For example, decoder 106a can be coupled to routing circuit 111b.

In some embodiments, the NVM IC device 110 can include one or more programmable registers 107. The one or more programmable registers 107 can be Error-Correcting Code (ECC)-protected. In some embodiments, each programmable register 107 can be coupled to one or more routing circuits of the set of routing circuits 106b to 111b. In some embodiments, each programmable register can be programmed during system boot of the NVM IC device 110 by firmware to store a set of values. For example, each programmable register can store a multi-bit value. In some embodiments, the multi-bit value can be a value that is constant across all programmable registers. In some embodiments, the multi-bit value can be a value that is unique for each programmable register. For example, the multi-bit value can include a base field value and a mask field value. Each programmable register can also store additional values, including a bank select field value, a bank address mask value, and/or a configuration mode field value. Each programmable register can be configured to store each value during system boot by firmware of the NVM IC device 110. In some embodiments, the base field value and the mask field value are multi-bit values, e.g., 6-bit values. In some embodiments, the bank select field value is a multi-bit value, e.g., a 3-bit value. In some embodiments, the bank address mask field value and the configuration mode field value are each single-bit values, e.g., a 1-bit value.

In some embodiments, each value stored in a programmable register can be used to decode an incoming logical address at a routing circuit. In some embodiments, a decoder coupled to the routing circuit decodes the logical address using one or more of the values stored in the programmable register associated with the routing circuit. For example, the routing circuit 106b can receive a logical address for a memory access of the NVM IC device 110 from the host microcontroller 151. The decoder 106a can decode the logical address using one or more mathematical equations. The one or more mathematical equations can use Boolean logic in order to evaluate the logical address against the one or more values. In some embodiments, a decoder can decode the logical address using the multi-bit value (e.g., the base field value and the mask field value) in order to determine whether to accept or reject the logical address at the routing circuit. In some embodiments, if the decoder determines that the logical address is to be accepted at the routing circuit, the decoder can decode the logical address using the multi-bit value and the bank select field value in order to determine which physical region to send the data associated with the logical address out of the physical regions into which the NVM IC device is partitioned. In some embodiments, the decoder can also decode the logical address using the multi-bit value and the bank address mask field value in order to determine which destination address within the physical region to send the data associated with the logical address. In some embodiments, the decoder can also decode the logical address using the multi-bit value and the configuration mode field value in order to determine which configuration mode the NVM IC device is in (e.g., linear, SOTA-A-, SOTA-B configuration mode). In some embodiments, the decoder can receive the logical address and compare the logical address to the multi-bit value stored at each programmable register of the set of routing circuits of the NVM IC device 110. In response to comparing the logical address to the multi-bit values stored at each programmable register of the set of routing circuits, the decoder can identify which routing circuit of the set of routing circuits to transmit data associated with the logical address. For example, the processing logic can send the data associated with the logical address to routing circuit 107b, where the decoder 107a can decode the logical address received, as described with respect to decoder 106a herein above.

Figure 1B:
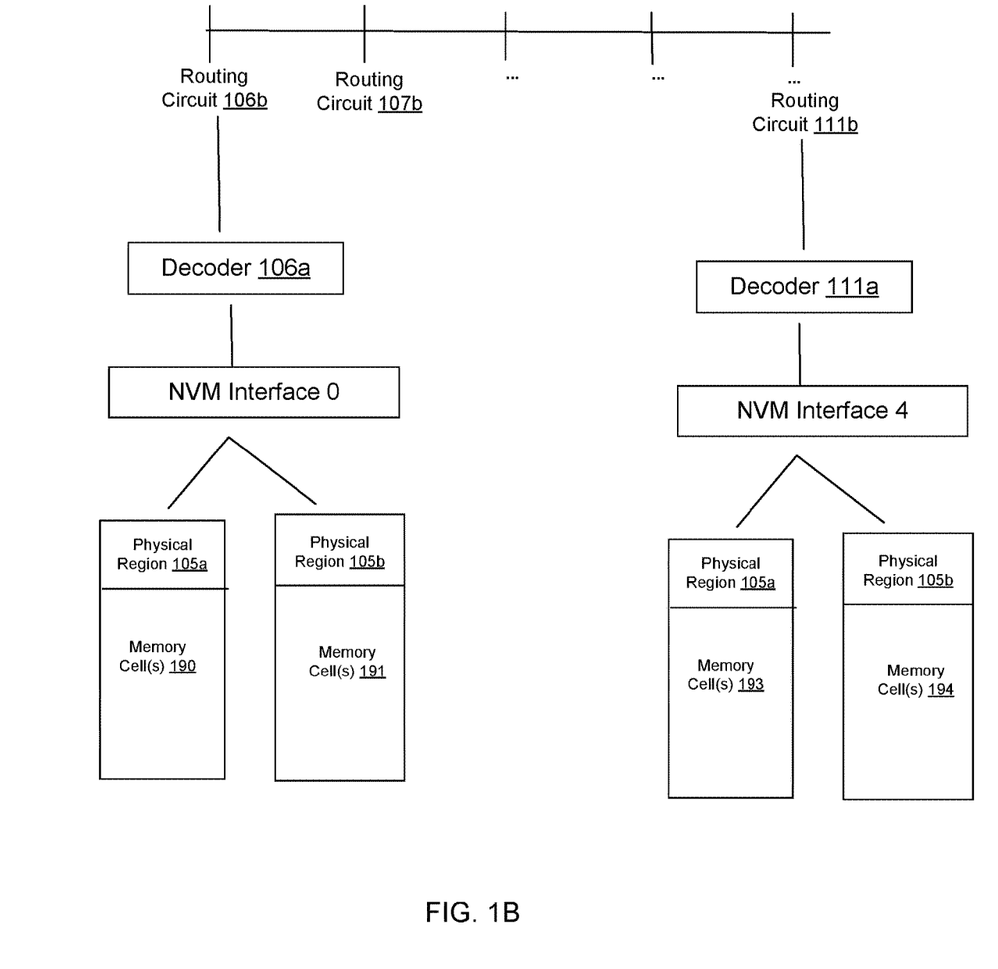
FIG. 1B is a block diagram of the system of FIG. 1A, in accordance with embodiments of the present disclosure.

FIG. 1B is a block diagram of the system 100 of FIG. 1A in which the NVM IC device 110 includes the decoders 106a and 111a coupled to routing circuits 106b and 111b, respectively. Each decoder 106a and 111b can also be associated with (e.g., coupled to) an NVM interface 0 and 4, respectively. Each NVM interface can be attached to a portion of each of the physical regions of the NVM IC device. For example, the NVM interface 0 can be attached to one or more memory cells 190 of physical region 105a and one or more memory cells 191 of physical region 105b. The NVM interface 4 can be attached to one or more memory cells 193 of physical region 105a and one or more memory cells 194 of physical region 105b. Further details with regard to each component of the system 100 are described herein below.

Figure 2:
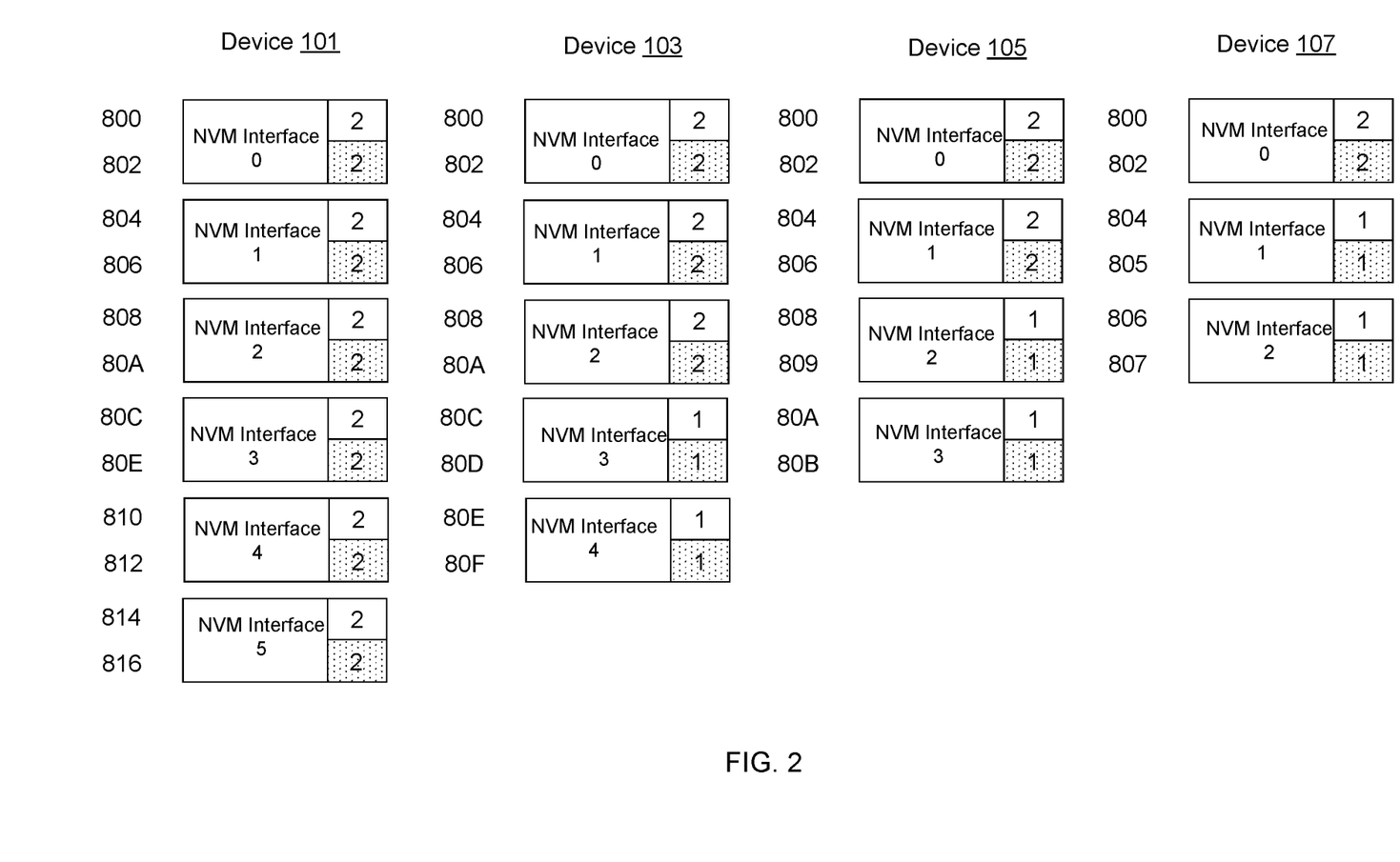
FIG. 2 is a memory map diagram of various NVM IC devices, in accordance with embodiments of the present disclosure.

FIG. 2 is a memory map diagram of various NVM IC devices, in accordance with embodiments of the present disclosure. As illustrated in FIG. 2, there can be devices 101, 103, 105, and 107. Each device can be configured according to a linear configuration. Each device can include one or more NVM interfaces. For example, device 101 can include NVM interfaces 0 to 5. Each NVM interface can be attached to two separate banks of memory (e.g., flash). For example, each NVM interface can be attached to an A bank and a B bank. Each bank attached to an NVM interface can store a particular amount of data, such as 2 MB. In a linear configuration, each address in each device can be consecutive. For example, device 101 can have data for each bank of each NVM interface stored at consecutive logical addresses, including logical address 800, 802, 804, 806, 80A, 80C, 80E, 810, 812, 814, 816, 840, etc. As illustrated in FIG. 2, each device 101-107 is of varying sizes. For example, device 103 includes NVM interfaces 0 to 4. Each NVM interface can be attached to two separate banks of memory. Each bank attached to an NVM interface can store a particular amount of data, such as 1 MB or 2 MB. Device 103 can have data for each bank of each NVM interface stored at consecutive logical addresses, such as 800, 802, 804, 806, 80A, 80C, 80D, 80E, 80F, etc.

Figure 3:
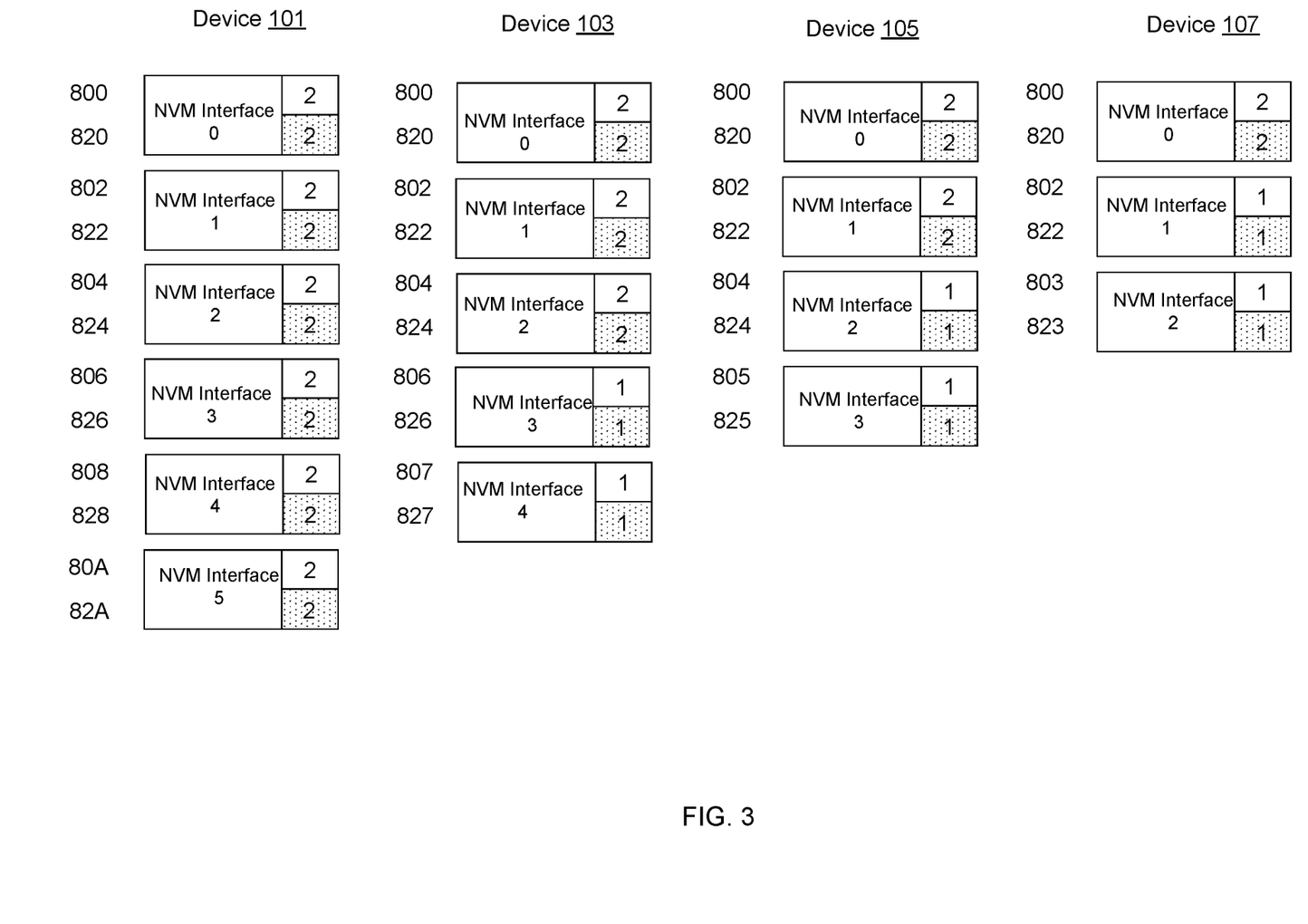
FIG. 3 is a memory map diagram of various NVM IC devices, in accordance with embodiments of the present disclosure.

FIG. 3 is a memory map diagram of various NVM IC devices, in accordance with embodiments of the present disclosure. In some embodiments, NVM IC devices can be configured according to a SOTA-A configuration mode, where the device is partitioned into two equal images and the device is executing out of the A image. Each device can include one or more NVM interfaces. For example, device 101 can include NVM interfaces 0 to 5. Each NVM interface can be attached to two separate banks of memory (e.g., flash). For example, each NVM interface can be attached to an A bank and a B bank. Each bank attached to an NVM interface can store a particular amount of data, such as 2 MB. In some embodiments, device 101 can have data for bank A of each NVM interface stored at logical addresses 800, 802, 804, 806, 808, 80A, etc. Device 101 can also have data for bank B of each NVM interface stored at logical addresses 820, 822, 824, 826, 828, 82A, etc. As illustrated in FIG. 3, each device 101-107 is of varying sizes. For example, device 103 includes NVM interfaces 0 to 4. Each NVM interface can be attached to two separate banks of memory. Each bank attached to an NVM interface can store a particular amount of data, such as 1 MB or 2 MB. Device 103 can have data for bank A of each NVM interface stored at logical addresses 800, 802, 804, 806, 807, etc. Device 103 can also have data for bank B of each NVM interface stored at logical addresses 820, 822, 824, 826, 827, etc.

Figure 4:
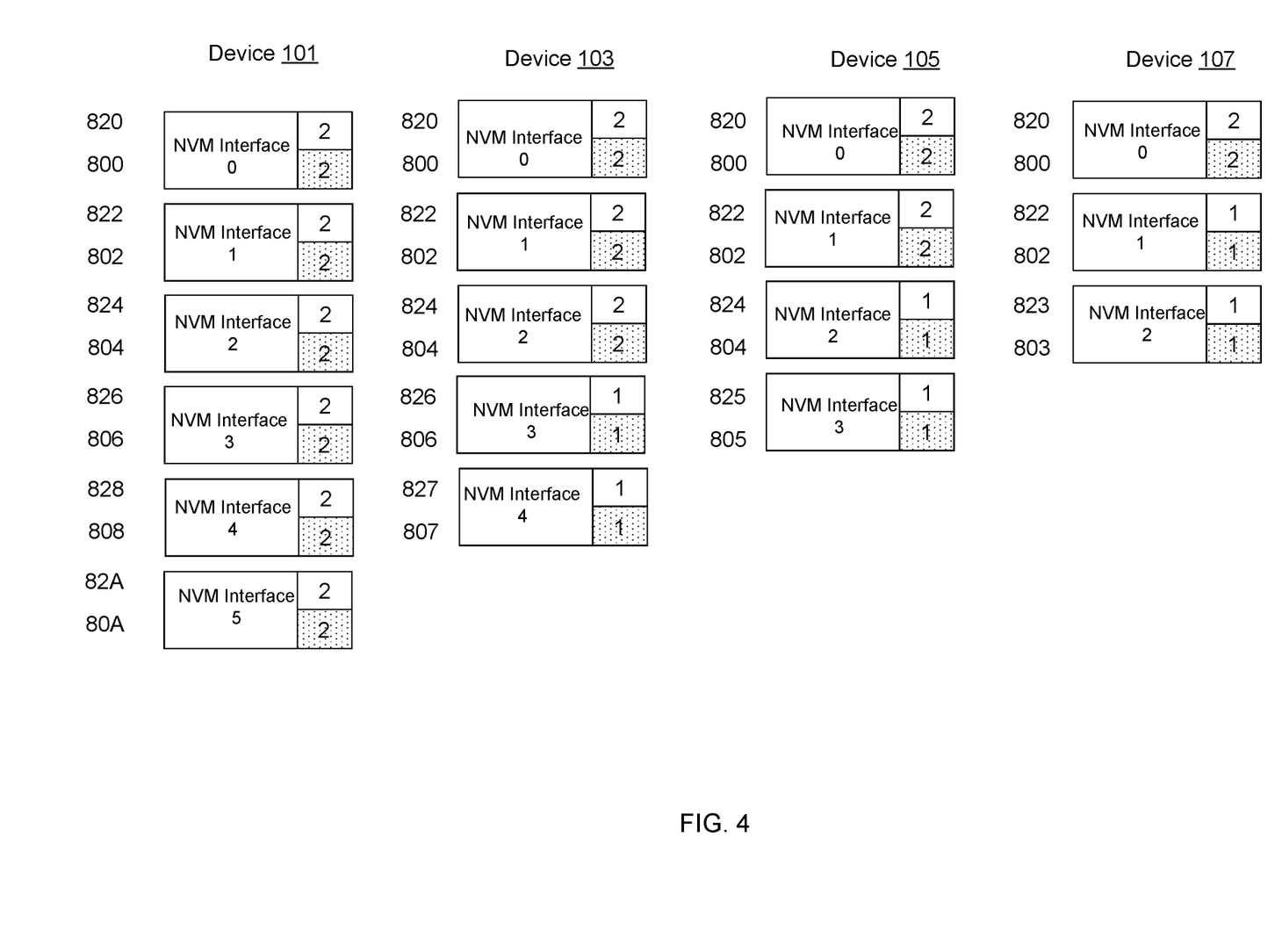
FIG. 4 is a memory map diagram of various NVM IC devices, in accordance with embodiments of the present disclosure.

FIG. 4 is a memory map diagram of various NVM IC devices, in accordance with embodiments of the present disclosure. In some embodiments, NVM IC devices can be configured according to a SOTA-B configuration mode, where the device is partitioned into two equal images and the data stored at image B is swapped with image A. Each device can include one or more NVM interfaces. For example, device 101 can include NVM interfaces 0 to 5. Each NVM interface can be attached to two separate banks of memory (e.g., flash). For example, each NVM interface can be attached to an A bank and a B bank. Each bank attached to an NVM interface can store a particular amount of data, such as 2 MB. In some embodiments, device 101 can have data for bank A of each NVM interface stored at logical addresses 820, 822, 824, 826, 828, 82A, etc. Device 101 can also have data for bank B of each NVM interface stored at logical addresses 800, 802, 804, 806, 808, 80A, etc. As illustrated in FIG. 4, each device 101-107 is of varying sizes. For example, device 103 includes NVM interfaces 0 to 4. Each NVM interface can be attached to two separate banks of memory. Each bank attached to an NVM interface can store a particular amount of data, such as 1 MB or 2 MB. Device 103 can have data for bank A of each NVM interface stored at logical addresses 820, 822, 824, 826, 827, etc. Device 103 can also have data for bank B of each NVM interface stored at logical addresses 800, 802, 804, 806, 807, etc.

Figure 5:
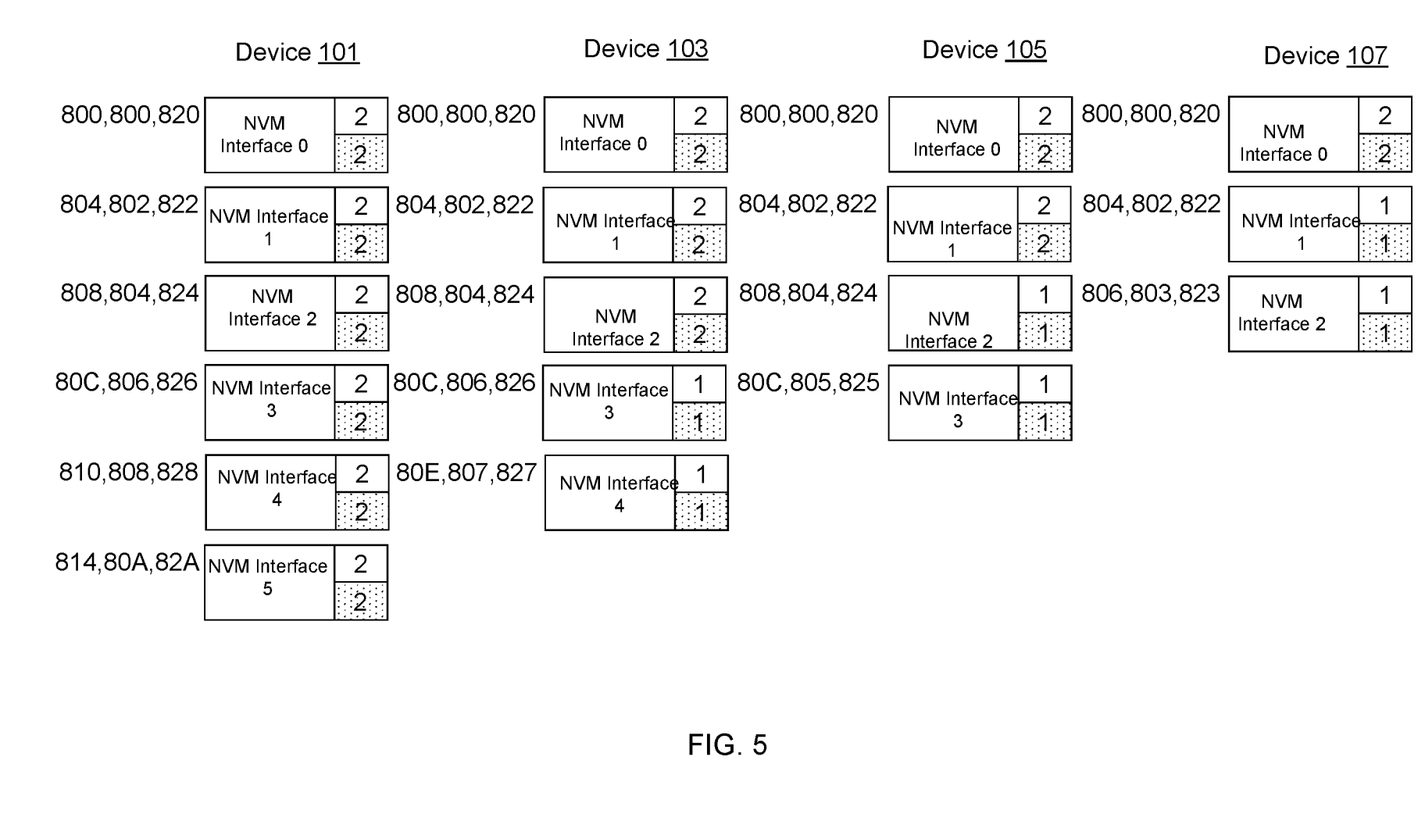
FIG. 5 is a memory map diagram of various NVM IC devices, in accordance with embodiments of the present disclosure.

FIG. 5 is a memory map diagram of various NVM IC devices, in accordance with embodiments of the present disclosure. In particular, FIG. 5 illustrates the address ranges that can be needed for bank A of each NVM interface according to the three configurations illustrated in FIGS. 2-4. As illustrated in FIG. 5, depending on the configuration, each NVM interface of each device can be addressable by a multiple number of logical addresses. For example, if device 101 is in a linear configuration, the NVM interface 0 needs to be addressed by 800, as illustrated in FIG. 2. If device 101 is in a SOTA-A configuration, the NVM interface 0 needs to be addressed by 800, as illustrated in FIG. 3. If device 101 is in a SOTA-B configuration, the NVM interface 0 needs to be addressed by 820, as illustrated in FIG. 4. Furthermore, device emulation can be a challenge due to the number of address ranges that can exist for each bank of each NVM interface depending on the configuration. For example, if device 101 is in SOTA-B configuration, NVM interface 4 needs to be addressed by 828, as illustrated in FIG. 4. However, if device 101 is to emulate device 103 in a SOTA-B configuration, the NVM interface may need to be addressed by another address, such as 827, which is the address for NVM interface 4 of device 103 in a SOTA-B configuration, as illustrated in FIG. 4. As described above, it can be expensive to hardcode each potential address range into the hardware of each device given the number of potential addresses that may be needed for each device given the configuration and device emulation modes. Instead, it can be desirable to provide for a flexible support by using configurable registers that can be used to decode address ranges, as described in more details herein below.

Figure 6A:
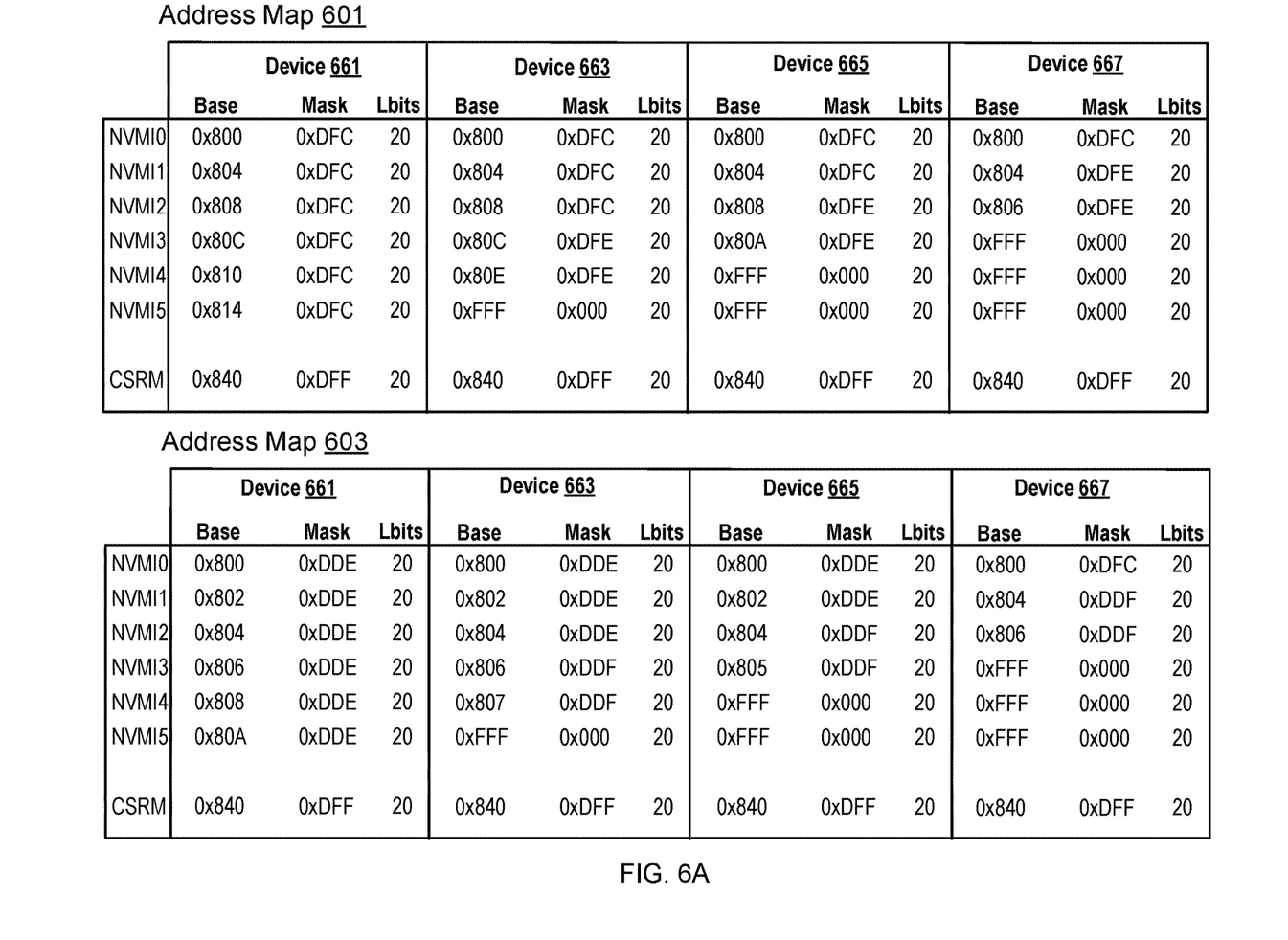
FIG. 6A is a block diagram illustrating base and mask field values to be configured in various NVM IC devices, in accordance with embodiments of the present disclosure.
Figure 6B:
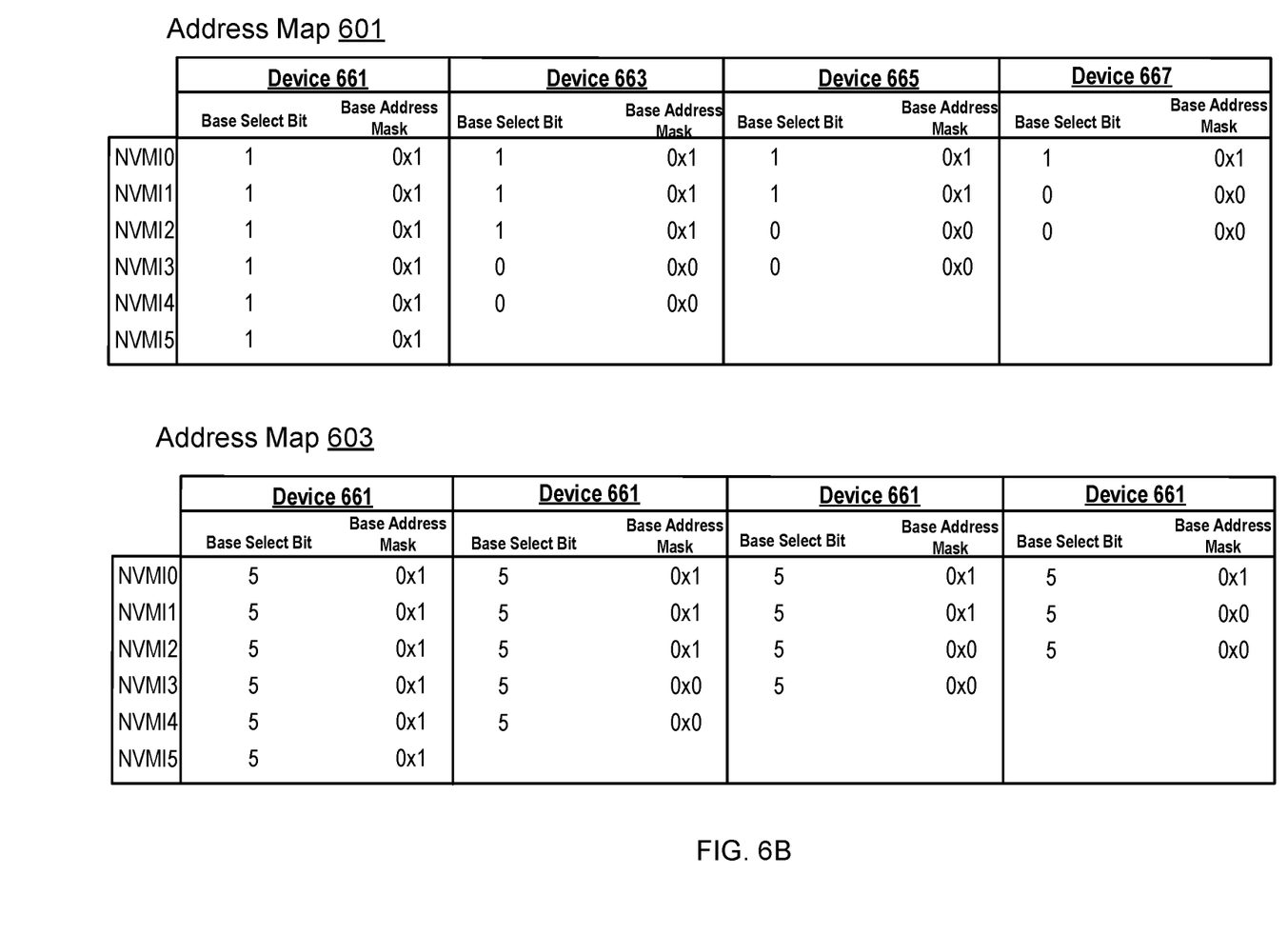
FIG. 6B is a block diagram illustrating base select and base address mask values to be configured in various NVM IC devices, in accordance with embodiments of the present disclosure.

FIG. 6A is a block diagram illustrating base and mask field values to be configured in various NVM IC devices, in accordance with embodiments of the present disclosure. FIG. 6B is a block diagram illustrating base select and base address mask values to be configured in various NVM IC devices, in accordance with embodiments of the present disclosure. FIGS. 6A-6B will be described in more detail in reference to FIG. 7 herein below.

Figure 7:
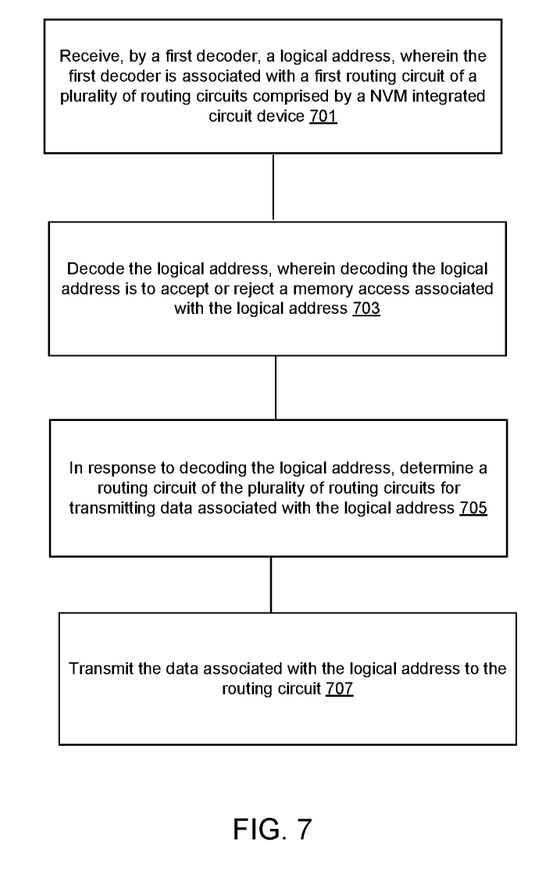
FIG. 7 is a flow diagram of a method for providing flexible support for memory device emulation and bank swapping, in accordance with embodiments of the present disclosure.

FIG. 7 is a flow diagram of a method 700 for providing flexible support for memory device emulation and bank swapping by using configurable registers that can be used to decode address ranges, in accordance with embodiments of the present disclosure. The method 700 may be performed by processing logic that may comprise hardware (e.g., circuitry, dedicated logic, programmable logic, microcode, etc.), software (such as instructions run on a processing device), firmware, or a combination thereof. In one embodiment, the method 700 is performed by the NVM integrated circuit device 110 of FIG. 1A, and more specifically by the processing device 103 of the NVM integrated circuit device 110.

With reference to FIG. 7, at operation 701, the processing logic receives a logical address. In some embodiments, the logical address can be received via a decoder (e.g., decoder 106a of FIGS. 1A-1B) of an NVM IC device (e.g., the NVM IC device 110 of FIG. 1A). The decoder can be one of a set of decoders, e.g., the decoders 106a to 111a of FIG. 1A. The decoder can be associated with a routing circuit (e.g., routing circuit 106b of FIGS. 1A-1B) of the NVM IC device. In some embodiments, the routing circuit can be one of a set of routing circuits, e.g., the routing circuits 106b to 111b of FIG. 1A. In some embodiments, the processing logic can receive the logical address for a memory access request from a host microcontroller (e.g., the host microcontroller 151 of FIG. 1A).

At operation 703, the processing logic decodes the logical address. In some embodiments, decoding the logical address results in an acceptance or rejection of the memory access associated with the logical address. In some embodiments, decoding the logical address includes identifying a set of values stored in a programmable register associated with the decoder, e.g., a programmable register of the one or more programmable registers 107 of FIG. 1A. In some embodiments, the programmable register can store a multi-bit value. In some embodiments, the multi-bit value can be a constant value that is common across all programmable registers for each decoder/routing circuit. In some embodiments, the multi-bit value can be a value that is unique for each programmable register. For example, the multi-bit value can include a base field and a mask field, as illustrated in FIG. 6A. In some embodiments, the base and mask fields can each be a multi-bit value, e.g., six-bit values. As illustrated in FIG. 6A, the device 661 can store a base and mask value for each NVM interface 0 to 5. For example, the device 661 can store a base field value 0x800 and a mask field value 0xDFC for NVM interface 0. The device 661 can store a base field value 0x804 and a mask field value 0xDFC for NVM interface 1. In some embodiments, address map 601 of FIG. 6A reflects the devices 661 to 667 in a linear configuration mode. In some embodiments, address map 603 of FIG. 6A reflects the devices 661 to 667 in a SOTA-A and/or SOTA-B configuration mode. In some embodiments, decoding the logical address includes identifying the multi-bit value (e.g., the base field and mask field) stored in one or more programmable registers. The processing logic can compare the logical address to each identified multi-bit value. In some embodiments, comparing the logical address can include evaluating the logical address against each identified multi-bit value includes using one or more mathematical equations that use Boolean logic.

At operation 705, the processing logic can determine a routing circuit for transmitting data associated with the logical address. Determining the routing circuit can include identifying the routing circuit in response to decoding the logical address. The processing logic can identify the routing circuit based on a result of evaluating the logical address against each identified multi-bit value using the one or more mathematical equations.

At operation 707, the processing logic transmits data associated with the logical address to the routing circuit identified at operation 705. In some embodiments, transmitting the data associated with the logical address can include transmitting the data to a physical region associated with the routing circuit. In some embodiments, the decoder identified at the identified routing circuit can further decode the logical address received, as described herein above with respect to operation 705.

Further at operation 707, the processing logic can further decode, using the decoder associated with the routing circuit identified at operation 705, the logical address. In some embodiments, further decoding the logical address can include identifying a bank select field value stored in the programmable register associated with the decoder/routing circuit. As illustrated in FIG. 6B, a device 661 can store a bank select value for each NVM interface 0 to 5. For example, the device 661 can store a bank select bit value of 1 for NVM interface 0. In some embodiments, address map 601 can reflect the devices 661 to 667 in a linear configuration mode. In some embodiments, address map 603 can reflect the devices 661 to 667 in a SOTA-A and/or SOTA-B configuration mode. In some embodiments, responsive to identifying the bank select field value in the programmable register, the processing logic can decode the logical address using the bank select field value and the multi-bit value stored in the programmable register. Decoding the logical address using the bank select field value and the multi-bit value can include evaluating the logical address against the bank select field value and the multi-bit value. In some embodiments, evaluating the logical address against the bank select field value and the multi-bit value includes using a mathematical equation that uses Boolean logic. Decoding the logical address can result in an identification of a physical region of the physical regions into which the NVM IC device is partitioned. For example, decoding the logical address can result in an identification of one of the physical regions 105a or 105b of FIG. 1B to transmit the logical address.

Further at operation 707, the processing logic can further decode, using the decoder, the logical address to identify a destination address within the physical region identified at operation 705 to transmit the logical address. In some embodiments, the processing logic can identify a bank address mask field value stored in the programmable register associated with the decoder/routing circuit. As illustrated in FIG. 6B, a device 661 can store a bank address mask field value for each NVM interface 0 to 5. For example, the device 661 can store a bank address mask value of 0x1 for NVM interface 0. In some embodiments, address map 601 can reflect the devices 661 to 667 in a linear configuration mode. In some embodiments, address map 603 can reflect the devices 661 to 667 in a SOTA-A and/or SOTA-B configuration mode. In some embodiments, responsive to identifying the bank address mask field value in the programmable register, the processing logic can decode the logical address using the bank address mask field value and the multi-bit value stored in the programmable register. Decoding the logical address using the bank address mask field value and the multi-bit value can include evaluating the logical address against the bank address mask field value and the multi-bit value. In some embodiments, evaluating the logical address against the bank address mask field value and the multi-bit value includes using a mathematical equation that uses Boolean logic.

Further at operation 707, the processing logic can further decode, using the decoder, the logical address to identify a configuration mode. In some embodiments, further decoding the logical address can include identifying a configuration mode field value stored in the programmable register associated with the decoder/routing circuit. Each device can store a configuration mode field value for each NVM interface. In some embodiments, the configuration mode field value can be a 1-bit value. In some embodiments, if the configuration mode field value is 0, the device is in a linear configuration mode. In some embodiments, if the configuration mode field value is 0 or 1, the device can be in a SOTA-A or SOTA-B configuration mode.

Figure 8:
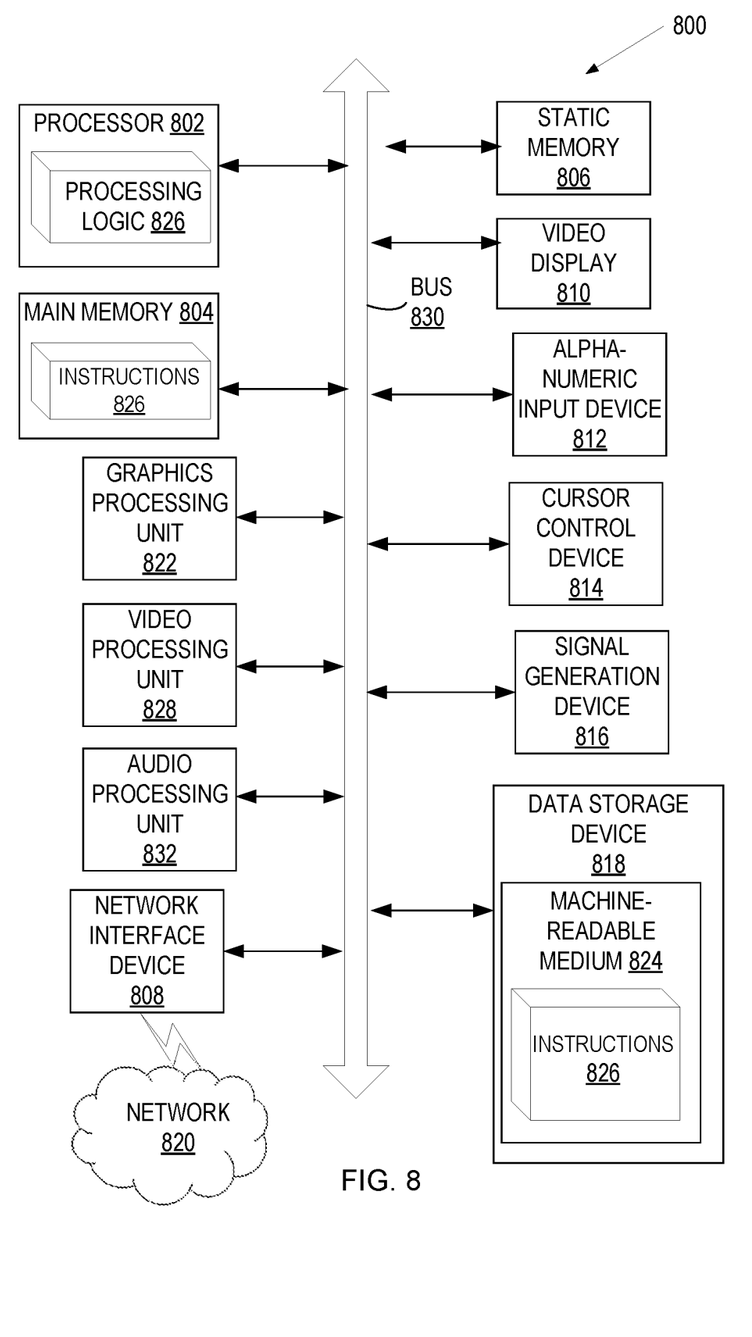
FIG. 8 illustrates a diagrammatic representation of a machine in the example form of a computing system within which a set of instructions, for causing the machine to perform any one or more of the methodologies discussed herein, may be executed.

FIG. 8 illustrates a diagrammatic representation of a machine in the example form of a computing system 800 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a host computing system or computer, an automotive computing device, a server, a network device for an automobile network such as a controller area network (CAN) or local interconnected network (LIN), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections may be implemented in computing system 800.

The computing system 800 includes a processing device 802, main memory 804 (e.g., read-only memory (ROM), flash memory, dynamic random access memory (DRAM) (such as synchronous DRAM (SDRAM) or DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor device, central processing unit, or the like processing device. More particularly, the processing device may be complex instruction set computing (CISC) microprocessor device, reduced instruction set computer (RISC) microprocessor device, very long instruction word (VLIW) microprocessor device, or processing device implementing other instruction sets, or processing devices implementing a combination of instruction sets. Processing device 802 may also be one or more special-purpose processing devices such as an application specific integrated circuit (ASIC), a field programmable gate array (FPGA), a digital signal processing device (DSP), network processing device, or the like. In one implementation, processing device 802 may include one or more processing device cores. The processing device 802 is configured to execute instructions 826 for performing the operations discussed herein. In one implementation, processing device 802 may be part of the system 100 of FIG. 1A and/or FIG. 1B.

Alternatively, the computing system 800 may include other components as described herein. The computing system 800 may further include a network interface device 808 communicably coupled to a network 820. The computing system 800 also may include a video display unit 810 (e.g., a liquid crystal display (LCD)), an alphanumeric input device 812 (e.g., a keyboard), a cursor control device 814 (e.g., a mouse), a signal generation device 816 (e.g., a speaker), or other peripheral devices. Furthermore, computing system 800 may include a graphics processing unit 822, a video processing unit 828, and an audio processing unit 832. In another implementation, the computing system 800 may include a chipset (not illustrated), which refers to a group of integrated circuits, or chips, that are designed to work with the processing device 802 and controls communications between the processing device 802 and external devices. For example, the chipset may be a set of chips on a motherboard that links the processing device 802 to very high-speed devices, such as main memory 804 and graphic controllers, as well as linking the processing device 802 to lower-speed peripheral buses of peripherals, such as USB, PCI, or ISA buses.

The data storage device 818 may include a computer-readable storage medium 824 on which is stored instructions 826 embodying any one or more of the methodologies or functions described herein. The instructions 826 may also reside, completely or at least partially, within the main memory 804 as instructions 826 and/or within the processing device 802 as processing logic during execution thereof by the computing system 800; the main memory 804 and the processing device 802 also constituting computer-readable storage media.

The computer-readable storage medium 824 may also be used to store instructions 826 utilizing the processing device 802, such as described with respect to FIGS. 1A-1B, and/or a software library containing methods that call the above applications. While the computer-readable storage medium 824 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methodologies of the implementations. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, the use of a module refers to the non-transitory medium, including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, the use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state, the apparatus, hardware, and/or element is designed to perform a particular task when the apparatus, hardware, and/or element is operating.

Furthermore, the use of the phrases 'to,' 'capable of/to,' and or 'operable to,' in one implementation, refers to some apparatus, logic, hardware, and/or element designed in such a way to enable the use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable the use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level, and 0 refers to a low logic level. In one implementation, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus for performing the operations herein. This apparatus may be specially constructed for the required purposes, or it may comprise a general-purpose hardware selectively activated or reconfigured by a firmware stored therein. Such firmware may be stored in a non-transitory computer-readable storage medium, such as, but not limited to, NVMs, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding, or carrying a set of instructions for execution by the hardware and that causes the hardware to perform any one or more of the methodologies of the present embodiments. The term "computer-readable storage medium" shall accordingly be taken to include, but not be limited to, solid-state memories, optical media, electro-magnetic media, any medium that is capable of storing a set of instructions for execution by hardware and that causes the hardware to perform any one or more of the methodologies of the present embodiments.

The above description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

What is claimed is:

1. A non-volatile memory (NVM) integrated circuit device comprising:
    a processing device;
    an NVM array of memory cells partitioned into a first physical region and a second physical region;
    a plurality of routing circuits;
    a first decoder associated with a first routing circuit;
    a second decoder associated with a second routing circuit;
    a first programmable register coupled to the plurality of routing circuits, wherein the first programmable register is to store a first multi-bit value, the first multi-bit value programmed by the processing device to configure a first address range associated with the first decoder; and
    a second programmable register coupled to the plurality of routing circuits, wherein the second programmable register is to store a second multi-bit value, the second multi-bit value programmed by the processing device to configure a second address range associated with the second decoder.

2. The NVM integrated circuit device of claim 1, wherein the first multi-bit value comprises a first base field and a first mask field.

3. The NVM integrated circuit device of claim 1, wherein the first decoder is to receive a logical address and decode the logical address using the first multi-bit value to accept or reject a memory access associated with the logical address.

4. The NVM integrated circuit device of claim 1, wherein the first decoder is to:
    receive a logical address;
    compare the logical address to the first multi-bit value and the second multi-bit value;
    responsive to comparing the logical address to the first multi-bit value and the second multi-bit value, determine a routing circuit of the first routing circuit and the second routing circuit for transmitting data associated with the logical address; and
    transmit the data associated with the logical address to the routing circuit.

5. The NVM integrated circuit device of claim 3, wherein, in response to the first decoder accepting the memory access associated with the logical address, the first decoder is further to:
    decode the logical address using the first multi-bit value and a first bank select field to identify a physical region of the first physical region and the second physical region to transmit data associated with the logical address, wherein the first programmable register is further to store the first bank select field.

6. The NVM integrated circuit device of claim 5, wherein decoding the logical address further comprises using a configuration mode field, wherein the first programmable register is further to store the configuration mode field.

7. The NVM integrated circuit device of claim 5, wherein, in response to the first decoder accepting the memory access associated with the logical address, the first decoder is further to:
    decode the logical address using the first multi-bit value and a first bank address mask field to identify a destination address within the physical region, wherein the first programmable register is further to store the first bank address mask field.

8. A method comprising:
    receiving, by a first decoder, a logical address, wherein the first decoder is associated with a first routing circuit of a plurality of routing circuits comprised by a non-volatile memory (NVM) integrated circuit device;
    decoding the logical address, wherein decoding the logical address is to accept or reject a memory access associated with the logical address;
    in response to decoding the logical address, determining a routing circuit of the plurality of routing circuits for transmitting data associated with the logical address; and
    transmitting the data associated with the logical address to the routing circuit.

9. The method of claim 8, wherein decoding the logical address further comprises:

identifying a first multi-bit value comprising a first base field and a first mask field in a first programmable register coupled to the plurality of routing circuits;

identifying a second multi-bit value comprising a second base field and a second mask field in a second programmable register coupled to the plurality of routing circuits; and comparing the logical address to the first multi-bit value and the second multi-bit value.

10. The method of claim 9, wherein the first base field and the first mask field are each programmed by a processing device of the NVM integrated circuit device into the first programmable register.

11. The method of claim 9, wherein the first programmable register is a protected register.

12. The method of claim 8, further comprising:

in response to accepting the memory access associated with the logical address, decoding, by the first decoder, the logical address using a first multi-bit value and a first bank select field to identify a physical region of a first physical region and a second physical region of the NVM integrated circuit device to transmit the data associated with the logical address, wherein the first multi-bit value and the first bank select field are stored in a programmable register coupled to the plurality of routing circuits.

13. The method of claim 12, further comprising decoding the logical address using a configuration mode field, wherein the configuration mode field is stored in the programmable register.

14. The method of claim 12, further comprising:

in response to accepting the memory access associated with the logical address, decoding, by the first decoder, the logical address using the first multi-bit value and a first bank address mask field to identify a destination address within the physical region, wherein the first bank address mask field is stored in the programmable register.

15. A system comprising:

a host microcontroller; and a non-volatile memory (NVM) integrated circuit device coupled to the host microcontroller, wherein the NVM integrated device comprises:

a processing device;

an NVM array of memory cells partitioned into a first physical region and a second physical region;

a plurality of routing circuits;

a first decoder associated with a first routing circuit;

a second decoder associated with a second routing circuit;

a first programmable register coupled to the plurality of routing circuits, wherein the first programmable register is to store a first multi-bit value, the first multi-bit value programmed by the processing device to configure a first address range associated with the first decoder; and a second programmable register coupled to the plurality of routing circuits, wherein the second programmable register is to store a second multi-bit value, the second multi-bit value programmed by the processing device to configure a second address range associated with the second decoder.

16. The system of claim 15, wherein the first multi-bit value comprises a first base field and a first mask field.

17. The system of claim 16, wherein the first decoder is to receive a logical address and decode the logical address using the first multi-bit value to accept or reject a memory access associated with the logical address.

18. The system of claim 15, wherein the first decoder is to:

receive a logical address;

compare the logical address to the first multi-bit value and the second multi-bit value;

responsive to comparing the logical address to the first multi-bit value and the second multi-bit value, determine a routing circuit of the first routing circuit and the second routing circuit for transmitting data associated with the logical address; and transmit the data associated with the logical address to the routing circuit.

19. The system of claim 17, wherein, in response to the first decoder accepting the memory access associated with the logical address, the first decoder is further to:

decode the logical address using the first multi-bit value and a first bank select field to identify a physical region of the first physical region and the second physical region to transmit data associated with the logical address, wherein the first programmable register is further to store the first bank select field.

20. The system of claim 19, wherein, in response to the first decoder accepting the memory access associated with the logical address, the first decoder is further to:

decode the logical address using the first multi-bit value and a first bank address mask field to identify a destination address within the physical region, wherein the first programmable register is further to store the first bank address mask.

* * * * *